US011463261B1

United States Patent
Kaddoura (10) Patent No.: US 11,463,261 B1
(45) Date of Patent: Oct. 4, 2022

(54) NESTED LEDGER

(71) Applicant: ARCHITECTURE TECHNOLOGY CORPORATION, Eden Prairie, MN (US)

(72) Inventor: Maher N. Kaddoura, Maple Grove, MN (US)

(*) Notice: Subject to any disclaimer, the term of this patent is extended or adjusted under 35 U.S.C. 154(b) by 107 days.

(21) Appl. No.: 17/121,125

(22) Filed: Dec. 14, 2020

Related U.S. Application Data (60) Provisional application No. 62/947,428, filed on Dec. 12, 2019.

(51) Int. Cl.
| | |
|---|---|
| G06F 15/16 | (2006.01) |
| H04L 9/32 | (2006.01) |
| H04L 9/06 | (2006.01) |
| H04L 9/00 | (2022.01) |

(52) U.S. Cl.
CPC .......... H04L 9/3239 (2013.01); H04L 9/0643 (2013.01); H04L 9/3247 (2013.01); H04L 9/50 (2022.05)

(58) Field of Classification Search
None
See application file for complete search history.

(56) References Cited

U.S. PATENT DOCUMENTS

| | | | |
|---|---|---|---|
| 10,616,324 B1 | 4/2020 | Kaddoura | |
| 2019/0019180 A1* | 1/2019 | Coburn | H04L 9/0637 |
| 2019/0303622 A1 | 10/2019 | Versteeg et al. | |
| 2020/0394162 A1 | 12/2020 | Iizuka | |
| 2021/0104326 A1 | 4/2021 | Lorenzo et al. | |
| 2021/0109797 A1 | 4/2021 | Zhou | |
| 2021/0176038 A1 | 6/2021 | Bortnikov et al. | |

OTHER PUBLICATIONS

"Non-Final Office Action", U.S. Patent and Trademark Office, U.S. Appl. No. 17/039,323, filed Feb. 11, 2022, 33 pgs.
U.S. Appl. No. 16/946,230, dated Jun. 11, 2020, Maher N. Kaddoura.

(Continued)

*Primary Examiner* — Brian Whipple
*Assistant Examiner* — Gregory P Tolchinsky
(74) *Attorney, Agent, or Firm* — Carlson, Caspers, Vandenburgh & Lindquist, P.A.

(57) ABSTRACT

Software configured to receive a first record is provided. The first record includes first record data, a first identification code in an identification code field, a first hash in a record hash field, and a second hash in a previous record pointer field. The first hash is calculated based on the first record data, the first identification code, and the second hash. The second hash is included in a record hash field of a second record. The second record includes the first identification code in its identification code field. A first block is generated having the first record in a first record field, a third hash in a block hash field, and a fourth hash in a previous block pointer field. The third hash is calculated based on the first record and the fourth hash. The fourth hash is included in a block hash field of a second block. The second block is part of a main ledger that includes a third block having the second record in its record field. The third block is positioned prior to the second block in the main ledger.

20 Claims, 8 Drawing Sheets

(56) References Cited

OTHER PUBLICATIONS

"Non-Final Office Action", U.S. Patent and Trademark Office, U.S. Appl. No. 16/946,230, filed Oct. 25, 2021, 9 pgs.
Weston et al., Performance of blockchain technology on DoD tactical networks, May 2019, SPIE, All pages (Year 2019).
"Final Office Action", U.S. Patent and Trademark Office, U.S. Appl. No. 16/946,230, filed Mar. 18, 2022, 7 pgs.

* cited by examiner

NESTED LEDGER

RELATED APPLICATIONS

This application claims the benefit of U.S. Provisional Application No. 62/947,428 filed on Dec. 12, 2019, entitled "SCALABLE AND RELIABLE BLOCKCHAIN FOR LOW BANDWIDTH AND UNSTABLE NETWORKS", which is hereby incorporated herein by reference.

GOVERNMENT CONTRACTS

This invention was made with government support under contract W56KGU-19-C-0037 awarded by the U.S. Army. The government may have certain rights in the invention.

BACKGROUND

Distributed ledger protocols constitute the underlying technology for developing Peer-to-Peer (P2P) databases, which possess three attributes that traditional databases lack: 1) disintermediation: data is available to all the nodes; 2) high fault tolerance: the database will continue to operate even if a large percentage of its nodes are disabled; 3) immutability: it is impossible to falsify data once it is committed to the database. Current distributed ledger systems fail, however, when deployed in low-bandwidth and disconnected-network environments, such as tactical networks.

BRIEF DESCRIPTION

Embodiments for a program product comprising a non-transitory processor readable medium having software stored thereon. The software, when executed by one or more processing devices, is configured to receive a first record. The first record includes first record data, a first identification code in an identification code field, a first hash in a record hash field, and a second hash in a previous record pointer field. The first hash is calculated based on the first record data, the first identification code, and the second hash. The second hash is included in a record hash field of a second record. The second record includes the first identification code in its identification code field. A first block is generated having the first record in a first record field, a third hash in a block hash field, and a fourth hash in a previous block pointer field. The third hash is calculated based on the first record and the fourth hash. The fourth hash is included in a block hash field of a second block. The second block is part of a main ledger that includes a third block having the second record in its record field. The third block is positioned prior to the second block in the main ledger.

Embodiments for a peer device having one or more processing devices and storage media communicatively coupled to the one or more processing devices. The storage media includes software stored thereon. The software, when executed by the one or more processing devices, is configured to receive a first record. The first record includes first record data, a first identification code in an identification code field, a first hash in a record hash field, and a second hash in a previous record pointer field. The first hash is calculated based on the first record data, the first identification code, and the second hash. The second hash is included in a record hash field of a second record. The second record includes the first identification code in its identification code field. A first block is generated having the first record in a first record field, a third hash in a block hash field, and a fourth hash in a previous block pointer field. The third hash is calculated based on the first record and the fourth hash. The fourth hash is included in a block hash field of a second block. The second block is part of a main ledger that includes a third block having the second record in its record field. The third block is positioned prior to the second block in the main ledger.

Embodiments for a method of constructing a ledger are also provided. The method includes receiving a first record. The first record includes first record data, a first identification code in an identification code field, a first hash in a record hash field, and a second hash in a previous record pointer field. The first hash is calculated based on the first record data, the first identification code, and the second hash. The second hash is included in a record hash field of a second record. The second record includes the first identification code in its identification code field. The method also includes generating a first block having the first record in a first record field, a third hash in a block hash field, and a fourth hash in a previous block pointer field. The third hash is calculated based on the first record and the fourth hash. The fourth hash is included in a block hash field of a second block. The second block is part of a main ledger that includes a third block having the second record in its record field. The third block is positioned prior to the second block in the main ledger.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
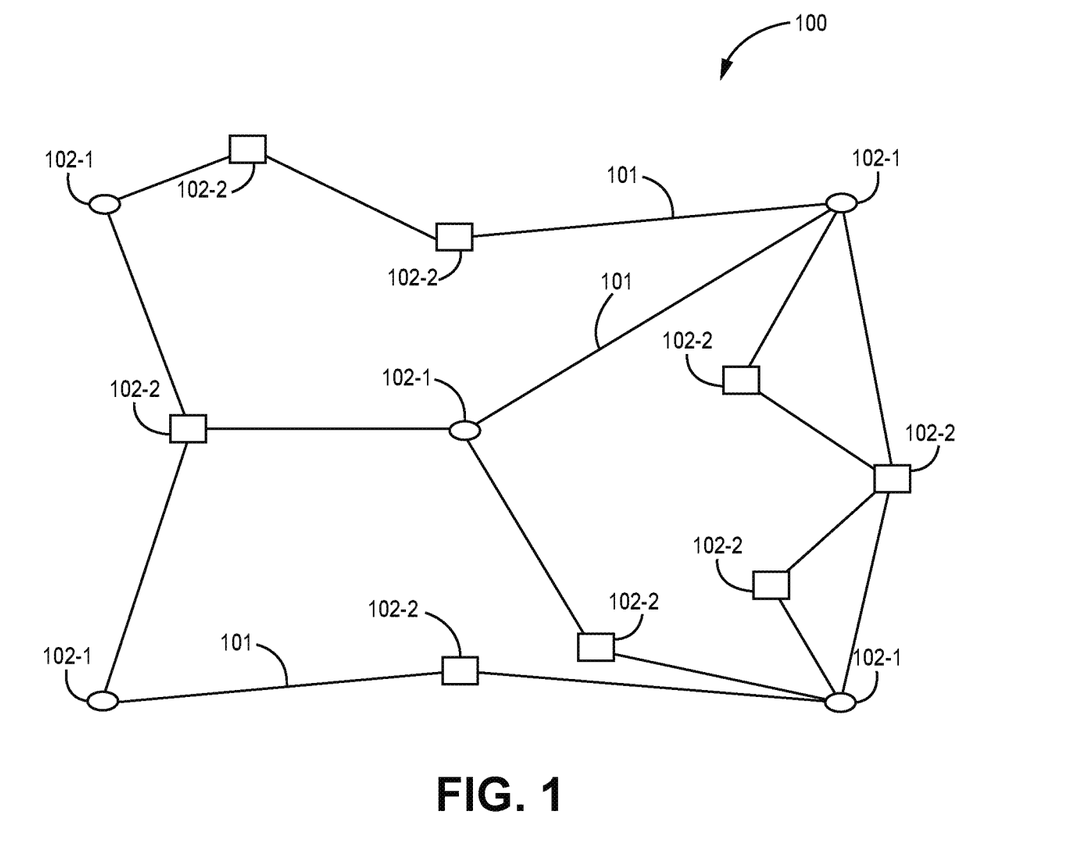
FIG. 1 is a block diagram of an example network that implements a P2P distributed ledger database that accounts for low-bandwidth and unstable network links.

FIG. 1 is a block diagram of an example network 100 that implements a P2P distributed ledger database that accounts for low-bandwidth and unstable network links. In an example, the distributed ledger is a blockchain. FIG. 1 includes a plurality of nodes that are communicatively coupled together via a plurality of network links 101. Each network link 101 can be a physical link implemented over one or more physical communication media (e.g., an Ethernet cable such as a cat-5E compliant cable) or can be a wireless link implemented using wireless signals. All or a portion of network 100 can communicate information via packets that conform to an internet protocol (IP) and/or can communicate information via a non-IP protocol (e.g., IPX, AppleTalk, NetBEUI).

The network nodes 102 can include ledger peers 102-1 and non-ledger peers 102-2. Ledger peers 102-1 are nodes that are members of a set, which implements a common ledger protocol to communicate messages amongst the ledger peers 102-1 in order to create and maintain one or more distributed ledgers. In an example, each ledger peer 102-1 obtains a copy of the one or more ledgers maintained by the set of ledger peers 102-1. Non-ledger peers 102-2 are nodes that communicate in the network 100, but do not implement the ledger protocol of the ledger peers 102-1. The ledger peer peers 102-1 and non-ledger peer nodes 102-2 can be any device capable of communicating with other nodes 102 in the network 100. This includes a mobile device such as a mobile phone, laptop, communications radio (e.g., tactical radio), a radio platform for installation in heavy equipment (e.g., military equipment, construction equipment), a wireless wearable device, or a wireless sensor. This also includes manned and unmanned vehicles with communication capabilities, such as heavy equipment, an automobile, an aircraft, or watercraft. This also includes networking devices such as a hub, switch, or router. Each ledger peer 102-1 includes ledger software to implement the ledger protocol thereon.

The plurality of nodes 102 implement one or more network protocols (e.g., IP) to effectuate communication amongst one another through the network 100. In an example, the network 100 sends IP packets to communicate information through the network 100. The ledger protocol implemented by the ledger peers 102-1 implements an overlay network protocol that controls communication of ledger messages/information amongst the ledger peers 102-1. The overlay network protocol operates on top of the (regular) network protocol(s). That is, the overlay network protocol communicates ledger messages/information amongst the ledger peers 102-1 by sending the ledger messages/information via the packets of the regular network protocols thereby using both ledger peers 102-1 and non-ledger nodes 102-2 of the network 100 to transport the ledger messages/information amongst the ledger peers 102-1.

Figure 2:
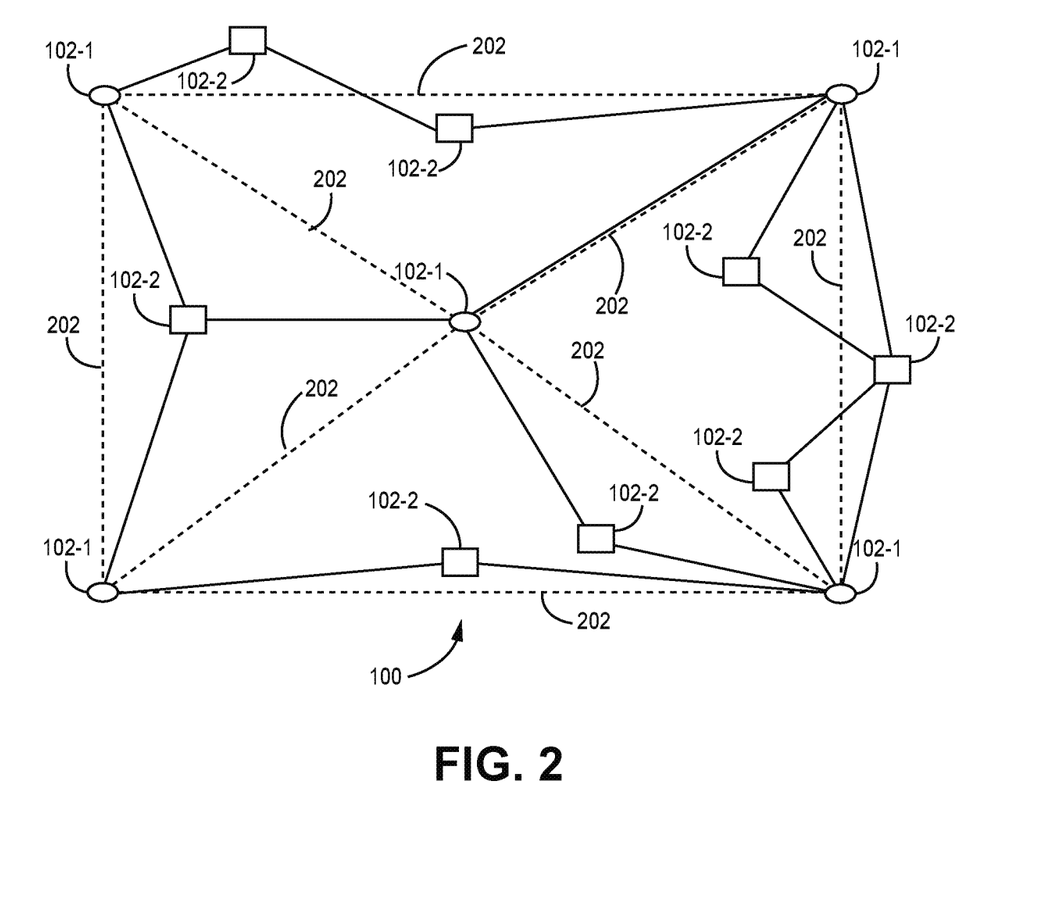
FIG. 2 is a modified version of FIG. 1 illustrating the overlay links between peers.

FIG. 2 is a modified version of FIG. 1 illustrating the overlay network links 202 between ledger peers 102-1. The overlay network protocol monitors overlay network links 202 between ledger peers 102-1 and implements aspects of the ledger protocol based on the characteristics of the overlay network links 202. An overlay network link 202 (also referred to herein as simply an "overlay link") is a logical communication path between two ledger peers 102-1. An overlay link 202 starts at a first ledger peer 102-1 and ends at a second ledger peer 102-1. The overlay network protocol can send a ledger message/information over an overlay link 202 to communicate that message/information from one ledger peer 102-1 to another ledger peer 102-1. The overlay link 202 can include a single (regular) network link 101 directly coupling the first ledger peer 102-1 to the second ledger peer 102-2 or the overlay link 202 can include multiple regular network links 101 such that the overlay link 202 traverses one or more intermediate non-ledger nodes 102-2. Accordingly, a packet corresponding to a ledger message/information can hop through one or more non-ledger nodes 102--2 as it traverses a single overlay link 202.

As mentioned above, the overlay network protocol uses the overlay links 202 to send ledger messages/information amongst the ledger peers 102-1. The overlay network protocol can implement an overlay routing protocol to control how ledger messages/information are routed amongst the ledger peers 102-1. To implement such a routing protocol, the overlay network protocol assigns and monitors the overlay network links 202. Assigning an overlay link 202 refers to the act of selecting which two ledger peers 102-1 make up the endpoints of a given overlay link 202. Two ledger peers 102-1 that make up the endpoint of an overlay link 202 are referred to herein as "neighbors". By assigning ledger peers 102-1 as endpoints of specific overlay links 202 the overlay network protocol establishes an overlay network amongst the peers 102-1.

Neighboring peers 102-1 can be assigned based on characteristics of the (regular) network links 101 forming the path between peers 102-1. The overlay network protocol can be configured to set up overlay links 202 such that no ledger peers 102-1 are an intermediary point for an overlay link 202. For example, if a first peer 102-1 is communicatively coupled to a third peer 102-1, but the network path from the first peer 102-1 to the third peer 102-1 travels through a second peer 102-1, the overlay protocol will not assign an overlay link between the first peer 102-1 and the third peer 102-1. Instead, the overlay protocol will assign a first overlay link 202 between the first peer 102-1 and the second peer 102-1, and a second overlay link 202 between the second peer 102-1 and the third peer 102-1.

Other characteristics used to assign an overlay link 202 can be the stability, bandwidth, whether a network path exists to a peer 102-1, and/or packet loss of a network path. For example, if a first peer 102-1 has network paths to multiple other peers 102-1, the overlay protocol can select which of the other peers 102-1 are neighbors based on the stability, bandwidth, and/or packet loss of the network paths between those peers 102-1. That is, the overlay routing protocol can select neighbors having network paths there between with higher stability, bandwidth, and/or lower packet loss. In an example, stability of an overlay link 202 can be a percentage of time the overlay link 202 is disconnected. Additional information regarding an example overlay network and characteristics thereof is provided in co-pending U.S. patent application Ser. No. 16/946,230, titled "P2P OVERLAY FOR DISTRIBUTED LEDGER", which is hereby incorporated herein by reference.

Figure 3:
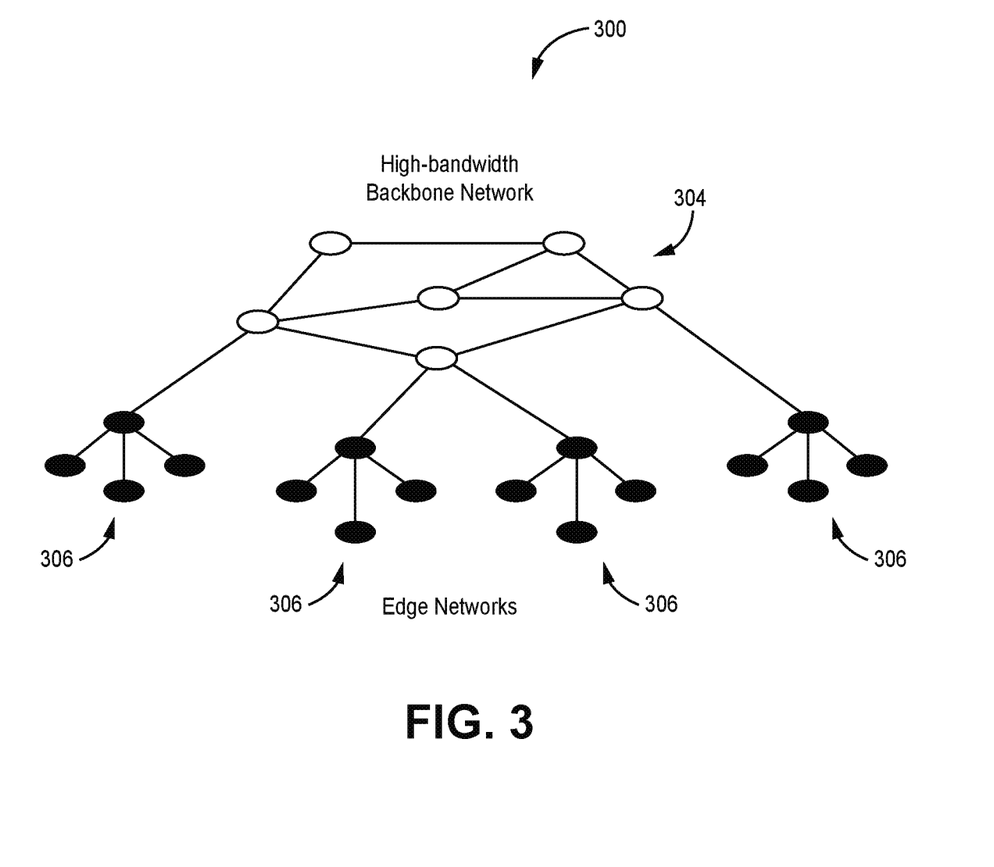
FIG. 3 is a block diagram of another example overlay network that is composed of multiple networks.

FIG. 3 is a block diagram of another example overlay network 300. In an example, the overall overlay network 300 can be divided up into different portions and each portion can be set-up and managed individually by the peers 102-1 of that portion. The example network 300 shown in FIG. 3 is divided into 5 different portions. The 5 portions include one core network 304 and four edge networks 306. An edge network 306 is also referred to as a tactical edge network (TEN) in the provisional Application No. 62/947,428, which is hereby incorporated herein by reference.

In an example, each peer 102-1 can be manually configured with information identifying the edge/core network 304, 306 of which that peer 102-1 is a part. When the peers 102-1 are communicatively coupled together, the peers 102-1 can identify other peers 102-1 in their core/edge network 304, 306 and implement the overlay routing protocol to set-up and manage their core/edge network independently of other core/edge networks. For example, if a peer 102-1 has information indicating that it is in the core network 304, the peer 102-1 implements its overlay network protocol based thereon.

In an example, the peers 102-1 can select neighbors and a routing protocol based on which core/edge network 304, 306 the peer 102-1 is a part of. For example, neighboring peers 102-1 for overlay links 202 can be limited to peers 102-1 that are within the same core/edge network 304, 306. This effectively creates separate routing spaces for each network 304, 306. The exception to limiting neighbors is for peers 102-1 in an edge network 306 that are selected as leaders. The overlay protocol can select one peer 102-1 in each edge network 306 as leader for that network 306. The leader can identify one or more overlay links 202 between itself and the core network 304. The overlay link(s) 202 between the leader and the core network 304 are used to transfer ledger messages/information between the edge network 306 and the core network 304.

Peers 102-1 can be selected to be in the core network 304 based on the characteristics of the peer 102-1 itself, the characteristics of the peer's potential overlay links with other peers 102-1 in the core network 304, and/or a domain or autonomous system that the peer 102-1 belongs to. For example, if a peer 102-1 has sufficiently high processing performance and has one or more sufficiently stable and high bandwidth links to other peers 102-1 in the core network 304 the peer 102-1 can be indicated as part of the core network. In other examples, the selection of which network a peer 102-1 is a part of can be based on a domain or autonomous system that the peer 102-1 belongs to. That is, the peer 102-1 can be set as part of the same network as other peers 102-1 in that peer's 102-1 LAN.

The distributed ledger(s) maintained by the peers 102-1 includes a plurality of blocks. The blocks include one or more records with information from a peer 102-1. A record can include information corresponding to ledger messages/information from a peer 102-1. In an example, peers 102-1 in edge networks 306 do not create blocks for a main distributed ledger themselves or participate in committing of blocks to a main distributed ledger. Instead, peers 102-1 in edge networks 306 send ledger messages/information for block creation and commitment to the core network 304. Peers 102-1 in the core network 304 then perform the computationally intensive process of creating a block(s) from the ledger message/information and committing the block(s) to the ledger. Once the block has been created, the block can be distributed back to peers 102-1 in the edge networks 306 along with peers 102-1 in the core network 304. Using this process to limit block creation for the main ledger to peers 102-1 in the core network 304 can be advantageous in situations where the edge networks 306 have generally lower bandwidth and/or lower computational power peers 102-1 than the core network 304.

Distribution of ledger messages/information can also be limited based on network. First, ledger messages/information in an edge network 306 can be distributed to all peers 102-1 in the edge network of which the message/information originated. For example, a ledger message/information from a peer 102-1 in a first edge network 306 can be distributed to all other peers 102-1 in the first edge network 306. Second, ledger messages/information can be distributed to the core network 304 regardless of which network the message originated in. Thus, a ledger message originating in the first network 304 can be distributed to all the peers 102-1 in the core network 304 in addition to peers 102-1 in the first edge network 306. Third, ledger messages/information from a given edge network 306 are not distributed to peers 102-1 in edge networks 306 from which they did not originate. Thus, a ledger message/information from the first edge network 306 is distributed to all peers 102-1 in the first edge network 306 and all peers 102-1 in the core network, but that message/information is not distributed to peers 102-1 in any other edge network 306. To restrict ledger messages/information from being distributed to other edge networks 306, peers 102-1 in the core network 304 can be configured not to transmit ledger messages/information to peers 102-1 in edge networks 306. Thus, the ledger messages/information will be distributed through the first edge network 306 of origin by virtue of the overlay routing protocol implemented by the first edge network 306. The leader of the first edge network 306 will also forward the ledger message/information to the core network 306. The overlay routing protocol of the core network 304 will distribute the message/information to all peers 102-1 of the core network 304, but the peers 102-1 of the core network 304 will not distribute the message/information to any edge networks 306. Thus, distribution of the message/information will be limited to the edge network of origin and the core network 304. Limiting message/information distribution in this way is another way to reduce bandwidth and processing requirements on the edge networks 306.

In an example, distribution of the blocks created for a main ledger is not limited, such that blocks are distributed to all peers 102-1 in all networks 304, 306, so that all peers 102-1 can have a copy of the ledger(s) being maintained. Thus, distribution of ledger messages/information can be limited, but distribution of the blocks for the main ledger incorporating those messages/information is not limited.

Figure 4:
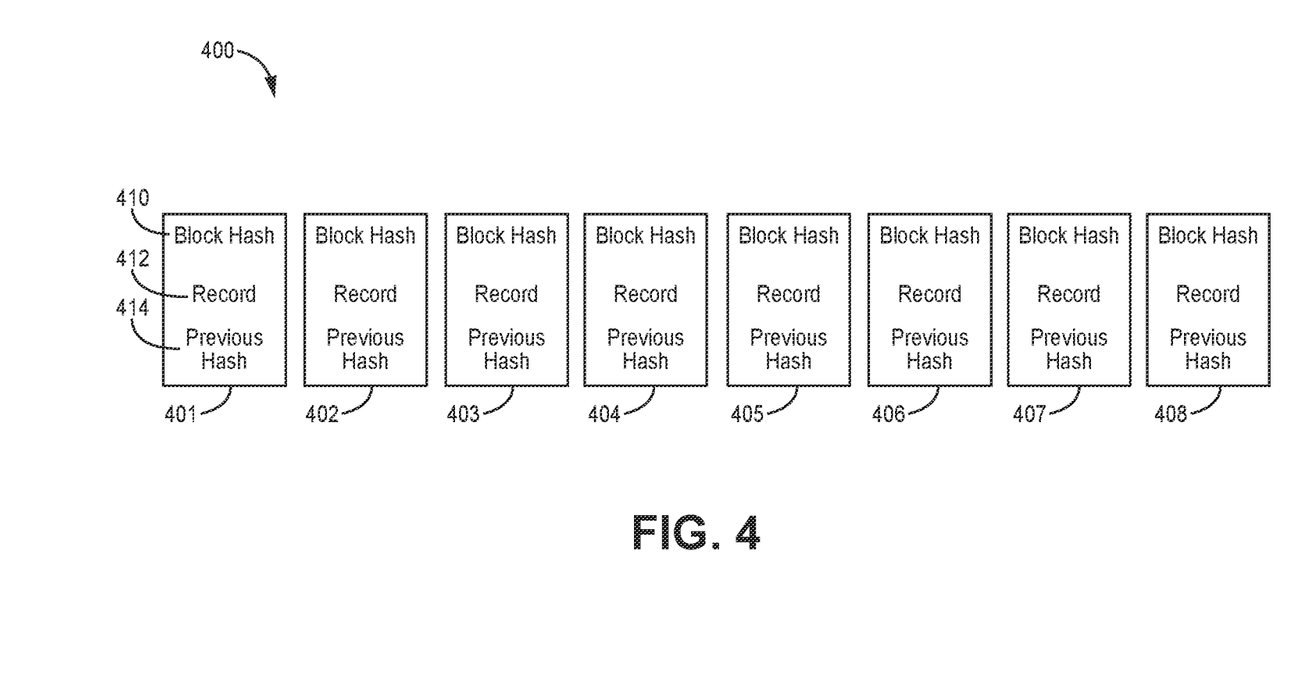
FIG. 4 is a block diagram of an example main ledger maintained by the network of FIG. 3.

FIG. 4 is a block diagram of an example main ledger 400 created and maintained by the network 300. The main ledger 400 includes a plurality of blocks 401-408. Individual blocks can include a block hash field 410, a record field 412, and a previous block pointer field 414. The record field 412 includes one or more records generated by one or more peers 102-1 that are sent to the core network 304 in respective ledger messages for committing to the main ledger 400. The main ledger 400 can include records from multiple different peers 102-1. The previous block pointer field 414 includes a copy of the hash from the block hash field 410 of the prior block in the main ledger 400. The previous block pointer field 414 is used so that each non-initial block 401-408 references its prior block 401-408 in the main ledger 400 forming a "chain" amongst the blocks 401-408.

Individual blocks 401-408 can also include a hash in the block hash field 410. The hash for a block is calculated to incorporate both the records in the record field 412 and the hash in the previous block pointer field 414 for that block, such that any unauthorized changes to the records in the record field 412 or the hash in the previous block pointer field 414 can be identified due to the hash in the block hash field 410 not correlating to the changed records or previous block hash. The hash function used to calculate the hash is in accordance with the protocol of the main ledger 400 and can be generated in accordance with known techniques.

Figure 5:
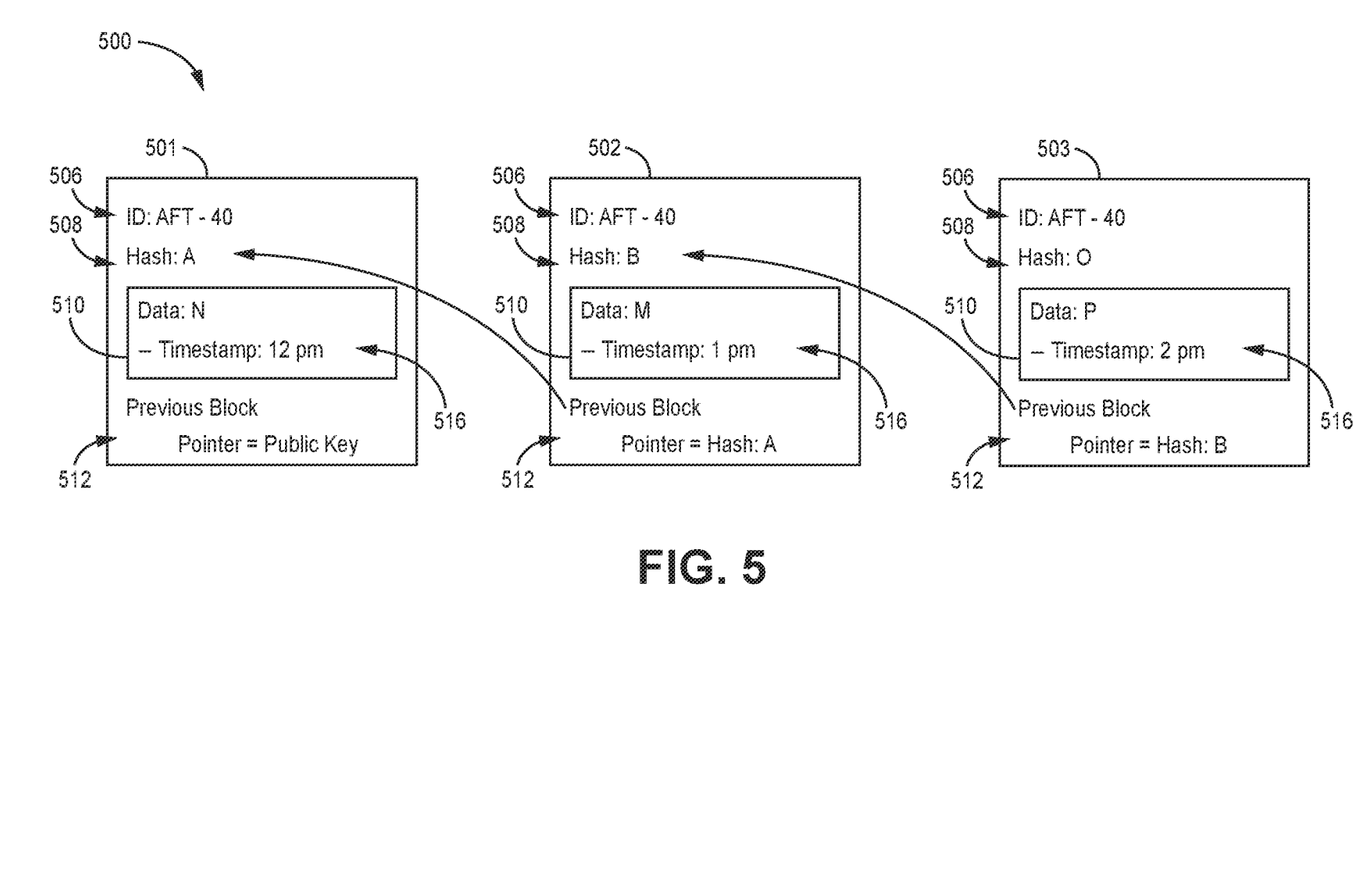
FIG. 5 is a block diagram of example embedded ledger included in the main ledger implemented by the network of FIG. 4.

FIG. 5 is an illustration of example embedded ledger 500 that can be embedded within the main ledger 400. The embedded ledger 500 includes a plurality of records/blocks 501-503. The initial block 501 in the embedded ledger 500 can include an identification code field 506, a record/block hash field 508, a record data field 510, and a public key 512. Subsequent blocks 502, 503 in the embedded ledger 500 can include the identification code field 506, record/block hash field 508, record/block data field 510 and a previous record/block pointer field 514.

The identification code field 506 includes an identification code identifying the embedded ledger of which the block 501-503 is a part. The identification code in the identification code field 506 identifies which of the plurality of embedded ledgers 500 that block is a part of. In an example, each embedded ledger 500 has a unique identification code and the identification codes used throughout the network 300 are coordinated so that each embedded ledger 500 to achieve this uniqueness.

The record hash field 508 includes a hash for the block 501-503. The hash is calculated to incorporate both the data in the record data field 510 and the hash in the previous block pointer field 512 for that block, such that any unauthorized changes to the data in the record data field 510 or the hash in the previous block pointer field 512 can be identified due to the hash in the record hash field 508 not correlating to the changed data or previous record data hash. The hash function used to calculate the hash is in accordance with the protocol of the embedded ledger 500 and can be generated in accordance with known techniques. The hash function can be the same as or different than the hash function used to calculate hashes for the main ledger 400. The previous block pointer field 512 includes a copy of the hash from the record hash field 510 of the prior block in that embedded ledger 500. The previous block pointer field 512 is used so that each non-initial block 502, 503 references its prior block 501, 502 in the embedded ledger 500 forming a "chain" amongst the blocks 501-503.

Figure 6:
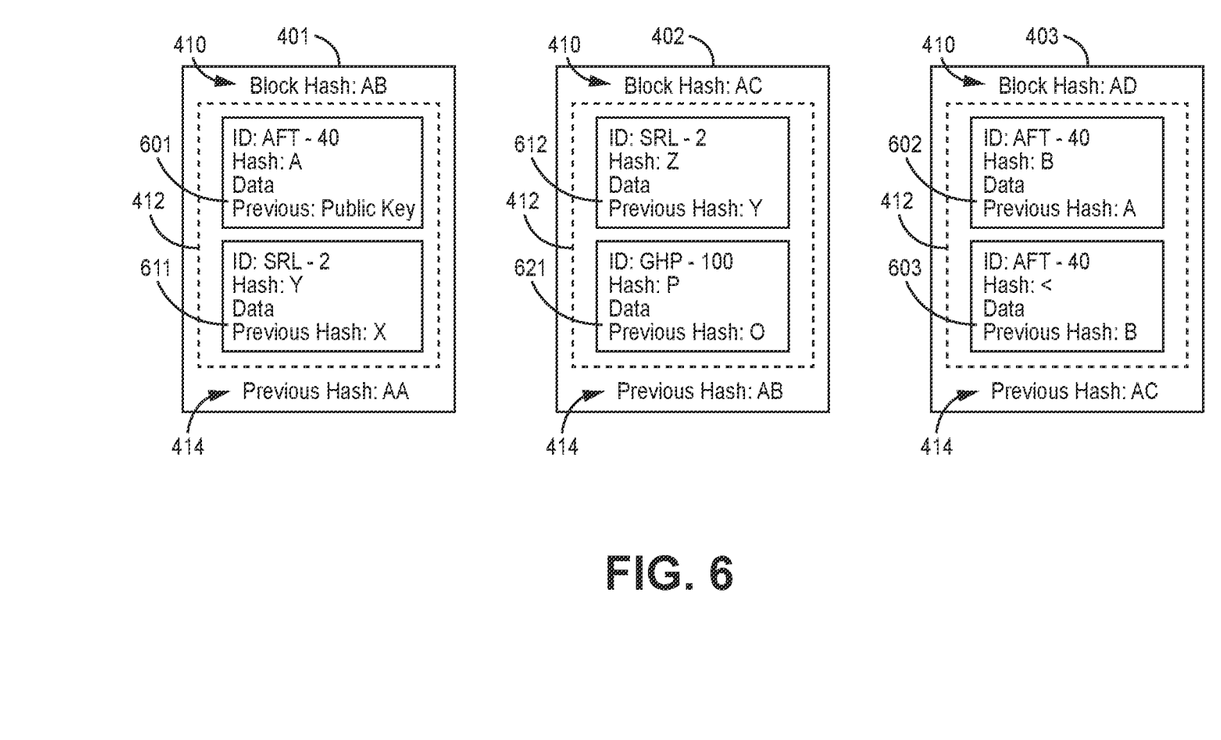
FIG. 6 is a block diagram of blocks from the main ledger of FIG. 4 having blocks from embedded ledgers therein.

FIG. 6 is a block diagram of an example of blocks 401-403 of the main ledger 400 having embedded therein example blocks 601-603, 611-612, and 621 of a plurality embedded ledgers 500. Blocks 601-603 correspond to a first embedded ledger 500 having ID code: AFT-40. Blocks 611-612 correspond to a second embedded ledger 500 having ID code: SRL-2. Block 621 corresponds to a third embedded ledger having ID code: GHI-100. Although two blocks are shown embedded within each block 401-403 of the main ledger 400 shown in FIG. 6, in other examples more or fewer than two blocks are embedded within an individual block.

The embedded ledgers 500 are separate ledgers from the main ledger 400 in the sense that the blocks 601-621 of the embedded ledgers 500 are distinct from the blocks 401-408 of the main ledger 400. The blocks 601-621 of the embedded ledgers 500 are distinct because they have distinct sets of data and distinct hashes that are calculated to incorporate their respective set of data. The sets of data of the embedded ledgers 500 and the main ledger 400 blocks are distinct in that different blocks contain different collections of data. There is overlap in the data, however, such that a given item of data can be included in a block 601-621 for the embedded ledgers 500 and a block 401-408 of the main ledger 400. In fact, each block 601-621 of the embedded ledgers 500 is included as a record in the record field 412 of a blocks 401-408 of the main ledger 400. Thus, the blocks 601-621 of the embedded ledgers 500 are embedded within the blocks 401-408 of the main ledger 400. This results in the embedded ledgers 500 being ledgers that are embedded within the main ledger 400.

One or multiple blocks 601-621 of the embedded ledgers 500 can be included in a single block (e.g., 402) of the main ledger 400. The blocks 601-621 of the embedded ledgers 500 can also be distributed across multiple blocks 401-408 of the main ledger 400. For example, blocks 601-621 of the embedded ledgers 500 can all be included in a single block 402 of the main ledger 400 or block 601 could be included in a first block 402 and block 602 and/or block 603 could be included in other blocks 403-408 of the main ledger 400. Notably, the blocks 601-603 of a first embedded ledger 500 do not need to be disposed adjacent to one another in the blocks 401-408 of the main ledger 400. In the example shown in FIG. 6, a first block 401 of the main ledger 400 can have a first block 601 of a first embedded ledger 500 therein, a subsequent block 402 of the main ledger 400 can have no blocks 601-603 of the first embedded ledger 500 therein, and the next block 403 of the main ledger 400 can have another one or more blocks 602, 603 of the first embedded ledger 500 therein. In the example shown in FIG. 6, each block 601-621 of the embedded ledgers 500 is included as a whole in a single block 401-408 of the main ledger 400. In an alternative example, one or more individual blocks 601-621 of the embedded ledgers 500 are distributed across multiple blocks 401-408 of the main ledger 400, such as a portion of block 603 of the first embedded ledger 500 being included in block 404 of the main ledger 400 and the remaining portion of block 603 included in block 405 of the main ledger 400.

The main ledger 400 can include blocks from multiple different embedded ledgers 500. In the example shown in FIG. 6, a first block 401 of the main ledger 400 includes a block 601 from a first embedded ledger and a block 611 from a second embedded ledger. Different embedded ledgers 500 can be maintained by the network 300 to capture data from different sets of data. Each embedded ledger 500 can include a respective set of data from a respective individual peer 102-1 or respective set of peers 102-1. In addition to or instead of having data from a given set of peers 102-1, an embedded ledger 500 can include data of a certain type, such as text messages in a communication stream or images captured by a device or of an area. In any case, each embedded ledger 500 can correspond to its own set of data being captured by one or more peers 102-1.

The main ledger 400 can also include data that is not part of an embedded ledger 500. For example, the first block 401 of the main ledger 400 can include a block 601 from a first embedded ledger 500, a block 611 from a second embedded ledger 500, and data that is not part of any embedded ledgers 500. As mentioned above, blocks of an embedded ledger 500 and/or other data from peers 102-1 are stored as records in the record field 412 of the blocks 401-408 of the main ledger 400.

In an example, the blocks 601-621 of the embedded ledgers 500 are constructed by the peer 102-1 that generates the data to be included in the blocks 601-621. Referring back to FIG. 5, a first peer 102-1 can generate a first message to be included in a first embedded ledger 500 within the main ledger 400. The first peer 102-1 can then generate a block 502 for the first embedded ledger 500 that includes the first message as data in the record data field 510 of the first block 502. In the process of creating the first block 502, the first peer 102-1 also places the identification code corresponding to the first embedded ledger 500 in the identification code field 506, the hash of the previous block 501 in the previous block pointer field 512. The first peer 102-1 calculates a hash for the first block 502 and places the calculated hash in the block hash field 508. Calculating a hash for the first block 502 can include calculating the hash based on a private key of the first peer 102-1 along with the data in the record data field 510, the record data pointer field 512 and, optionally, the identification code field 506. Accordingly, the hash can be verified based on the data in the record data field 510, the record data pointer field 512 and the identification code field 506 (optional) along with the public key corresponding to the private key used to calculate the hash.

The first block 502 can then be sent to the core network 304 in a ledger message for committing to the main ledger 400. In the core network 304, the first block 502 can be validated and, if validation is successful, incorporated into a block 401-408 of the main ledger 400. The first block 502 can be incorporated as a record in the record field 412 of a block 401-408 of the main ledger 400. The process of incorporating the first block 502 into a block 401-408 of the main ledger 400 is as discussed above for incorporation of ledger messages/information. Validating the first block 502 can include verifying that the hash in the block hash field 508 of the first block 502 is proper. In an example, the core network 304 can verify the hash based on the public key received for the first embedded ledger 500.

The public key for the first embedded ledger 500 corresponds to the private key used to create the hash for the blocks 501-503 of the first embedded ledger 500. In an example, the public key is incorporated into an initial block 501 of the first embedded ledger 500. Such an initial block 501 is also referred to herein as a genesis block or genesis message. The genesis block 501 can include the identification code for the first embedded ledger 500 in the identification code field 506, a hash for the block 501 in the block hash field 508, ordering information and optionally additional record data in the record data field 510, and the public key corresponding to the private key used to calculate the hash in the block hash field 508. The public key can be in the previous block pointer field 512 or in another field of the block 501 as desired. Accordingly, when a first peer 102-1 would like to create a new embedded ledger 500 to capture a new set of data, the first peer 102-1 can initiate the new embedded ledger 500 by creating and sending a genesis block for the new embedded ledger 500 to the core network 304 for committing to the main ledger 500. The genesis message can include a new identification code for the new embedded ledger 500. The genesis message also includes a public key corresponding to the private key used to create the hash in the genesis message as discussed above. In an example, the private key used to create the hash is a private key that is linked to the first peer 102-1. The private key and public keys can be issued by an appropriate certification authority using any appropriate scheme, such as a Public Key Infrastructure (PKI) or Identify Based Encryption (IBE), Any peer 102-1 in the network 300 can initiate an embedded ledger 500 in this way. The block 502 subsequent to the genesis block 501 in the embedded ledger 500 can include in its previous block pointer field 512, the hash from the block hash field 508 in order to link that block 502 to the genesis block 501.

Upon receiving a genesis block, the core network 304 can validate the genesis block by checking the hash of the genesis block with the public key included therein. If the hash is proper, the core network 304 can incorporate the genesis block as a record in a block 401-408 of the main ledger 400. Upon receiving a non-genesis block (i.e., a block in an embedded ledger 500 subsequent to the genesis block), the core network 304 can validate the block by checking the hash of the non-genesis block with the public key included in the genesis block having a matching identification code to the non-genesis block being checked. If the hash is proper, the core network 304 can incorporate the non-genesis block as a record in a block 401-408 of the main ledger 400. If a hash for a genesis or non-genesis block is not proper, the core network 304 can take appropriate action, such as communicating the failure of validation to the peer 102-1 from which the block was received and/or discarding the block without incorporating it into a block for the main ledger 400. Similarly, in some examples, any data that is not validated as part of an embedded ledger is discarded by the core network 304.

Because a proper hash can only be created by an entity possessing the private key that corresponds to the public key in the genesis block, this process of embedding ledgers within the main ledger 400 enables the core network 304 to verify the provenance of newly received data before that data is incorporated into the main ledger 400.

As mentioned above, the data in the record data field 510 is data generated by a peer 102 that is subsequently captured in the block 501-503 of the embedded ledger 500. The data captured can be any desired data such as messages, mapping data (images), or other information. In an example, the data in each record data field 510 includes ordering information 516. Ordering information 516 is information that indicates an order for that data with respect to other data. In an example, the ordering information 516 in each record data field 510 indicates an order relative to the record data fields 510 of all the other blocks in the embedded ledger 500. In an alternative example, the ordering information 516 in each record data field 510 indicates an order relative to a subset of the other blocks in the embedded ledger 500. In this alternative example, the entire set of blocks in the embedded ledger 516 includes multiple subsets of blocks. Each subset of blocks has respective ordering information 516 that indicates an order for the data in that subset relative to other data in that subset. The ordering information 516 in one subset may not indicate an order relative to data in other subsets, however. In the example shown in FIG. 6, the ordering information 516 is a timestamp. The timestamp can be a time that corresponds to other data in the record data field 510, such as a time in which a message in the record data field 510 was sent or received. In another example, the ordering information 516 can be a transaction counter that is incremented each time a transaction for a specific account (e.g., a bank account) is recorded. Other examples of ordering information 516 are also possible. The peers 102-1 can build the blocks for an embedded ledger 500 such that the record data fields 510 are included in their respective blocks of the embedded ledger 500 in order in accordance with the ordering information 516. In an example, the core network 500 can also build the blocks for the main ledger 400 such that the blocks of the embedded ledger 500 included in blocks of the main ledger 400 in order in accordance with the ordering information 516.

Although blocks of the main ledger 400 have been described herein as being constructed by the core network 304, some or all of the blocks for the main ledger 400 can be constructed by peers 102-1 in the edge networks 306. The main ledger 400 can be created and maintained as described in one or more of the following patent applications, each of which is hereby incorporated herein by reference: U.S. patent application Ser. No. 16/946,230, filed on Jun. 11, 2020 and titled "P2P OVERLAY FOR DISTRIBUTED LEDGER"; U.S. patent application Ser. No. 17/006,064, filed on Aug. 28, 2020 and titled "ZERO-LOSS MERGING OF DISTRIBUTED LEDGERS"; and U.S. patent application Ser. No. 17/039,323 and titled "PARALLEL DISTRIBUTED LEDGER CONSTRUCTION".

Figure 7:
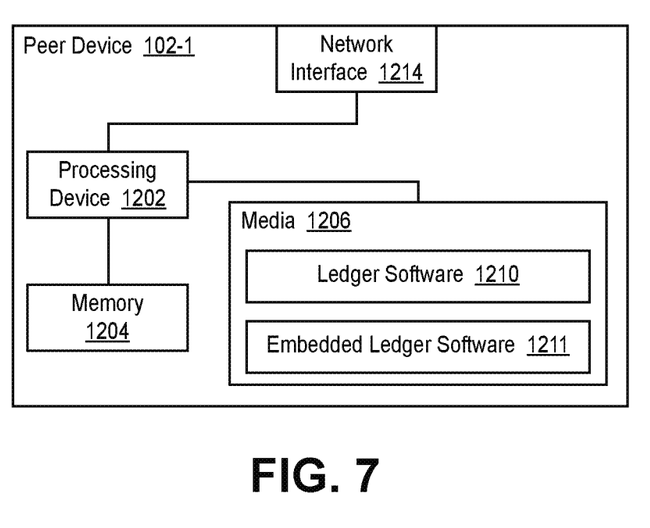
FIG. 7 is a block diagram of an example ledger peer.

FIG. 7 is a block diagram of an example peer device 102-1 implementing the ledger protocol to generate and maintain an embedded and/or main ledger as described herein. In an example, the peer device 102-1 can be an end-user device (e.g., a mobile phone, tactical radio). In another example, the peer device 102-1 can be a networking device (e.g., a router) configured to implement routing protocols (e.g., IP) for the network 100 in addition to the ledger protocol. In yet another example, the peer device 102-1 can be a standalone network appliance installed within the (IP) network 100 to implement the ledger protocol in the network 100.

In any case, the peer device 1024 has ledger software 1210 thereon to implement the ledger protocol described herein. The ledger software 1210 can include embedded ledger software 1211 to implement the embedded ledger processes described herein. The peer device 102-1 can include one or more processing devices 1202 to execute the instructions of the ledger software 1210. The one or more processing devices 1102 can include a general-purpose processor or a special purpose processor. The instructions of the ledger software 1210 are stored (or otherwise embodied) on or in an appropriate storage medium or media 1206 (such as a flash or other non-volatile memory) from which the instructions are readable the processing device(s) 1202 for execution thereby. The peer device 102-1 also includes memory 1204 that is coupled to the processing device(s) 1202 for storing instructions (and related data) during execution by the processing device(s) 1202. Memory 1204 comprises, in one implementation, any suitable form of random-access memory (RAM) now known or later developed, such as dynamic random-access memory (DRAM). In other implementations, other types of memory are used.

The instructions of the ledger software 1210, when executed by the one or more processing devices 1202, cause the one or more processing devices 1202 to perform the actions (or a portion thereof) of a peer 102-1 described herein. This includes the actions relating to creating and maintaining ledgers, sending and routing ledger messages/ information, and implementing an overlay protocol as described herein.

The peer device 102-1 also includes one or more network interfaces 1214 for communicating with other ledger and non-ledger devices 102 in the network 100. The one or more network interfaces 1214 can be coupled to the one or more processing devices 1202. The one or more network interfaces 1214 can include wired and/or wireless interfaces such as an Ethernet interface, a satellite transceiver, an IEEE 802.11 transceiver, a cellular transceiver, or other interface.

Figure 8:
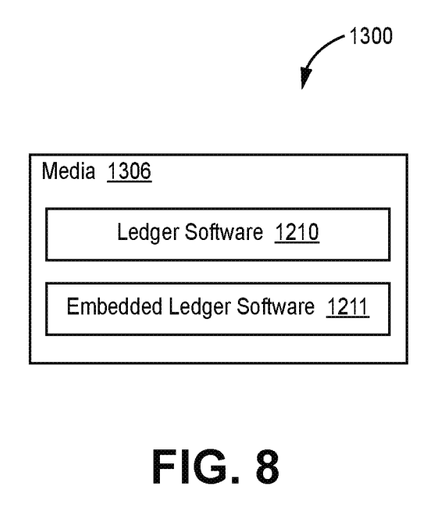
FIG. 8 is a block diagram of an example program product including ledger software for implementing the fork and merge processes described herein.

FIG. 8 is a block diagram of an example software product 1300 that includes ledger software 1210. The software product 1300 includes a computer readable medium 1302 including ledger software 1210 that can be loaded onto an appropriate hardware device. The ledger software 1210 includes instructions that are stored or otherwise embodied on the computer readable medium 1302. The ledger software 1210 can be loaded onto an appropriate hardware device, such as peer 1200, for the hardware device to execute the instructions and perform the functionality (or a portion thereof) of a peer device 102-1 as described herein. The computer readable medium 1202 on which the ledger software 1210 is stored can be any suitable computer readable media, such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable medium within a computing device (e.g., a server or network accessible storage).

What is claimed is:

1. A program product comprising:
a non-transitory processor readable medium having software stored thereon, the software, when executed by one or more processing devices, configured to:
receive a first record, the first record including first record data, a first identification code in an identification code field, a first hash in a record hash field, and a second hash in a previous record pointer field, wherein the first hash is calculated based on the first record data, the first identification code, and the second hash, wherein the second hash is included in a record hash field of a second record, the second record including the first identification code in its identification code field;
generate a first block having the first record in a first record field, a third hash in a block hash field, and a fourth hash in a previous block pointer field, wherein the third hash is calculated based on the first record and the fourth hash, wherein the fourth hash is included in a block hash field of a second block, the second block being part of a main ledger that includes a third block having the second record in its record field, wherein the third block is positioned prior to the second block in the main ledger.

2. The program product of claim 1, wherein the first hash is calculated with a private key of a peer that corresponds to the first identification code.

3. The program product of claim 2, wherein the first record data and the second record data are generated by the peer.

4. The program product of claim 3, wherein the software is configured to:
receive a genesis message from the peer, the genesis message indicating a start of a first embedded ledger, the first embedded ledger including the first record data and the third record data, the genesis message including the first identification code in an identification code field and a hash that is calculated based on the first identification code,
wherein the main ledger includes a plurality of embedded ledgers including the first embedded ledger.

5. The program product of claim 4, wherein the genesis message includes ordering information that indicates it is ordered prior to the first record and the second record in the first embedded ledger.

6. The program product of claim 4, wherein the genesis message includes a public key corresponding to the private key of the peer.

7. The program product of claim 6, wherein the software is configured to:
validate the first record by verifying the hash in the record hash field with the public key in the genesis message.

8. The program product of claim 1, wherein the software is configured to:
receive a third record, the third record including second record data, the first identification code in an identification code field, a fifth hash in a record hash field, and the first hash in a previous record pointer field, wherein the fifth hash is calculated based on the second record data, the first identification code, and the first hash;
generate a fourth block having the third record in a third record field and a sixth hash in a block hash field, wherein the sixth hash is calculated based on the third record,
wherein the first record data includes first ordering information and the third record data includes second ordering information, wherein the first and second ordering information indicate that the third record is ordered subsequent to first record, wherein generate the third block includes position the third block subsequent to the second block in the main ledger.

9. The program product of claim 8, wherein the first and second ordering information are one or more respective timestamps that indicate a chronological order.

10. The program product of claim 9, wherein the timestamp is a timestamp indicating a time in which a message was sent or received.

11. The program product of claim 9, wherein the first and second ordering information are respective transactions counter.

12. A peer device comprising:
one or more processing devices;
storage media communicatively coupled to the one or more processing devices, the storage media including software stored thereon, the software, when executed by the one or more processing devices, configured to:
receive a first record, the first record including first record data, a first identification code in an identification code field, a first hash in a record hash field, and a second hash in a previous record pointer field, wherein the first hash is calculated based on the record data, the first identification code, and the second hash, wherein the second hash is included in a record hash field of second record, the second record including the first identification code in its identification code field;
generate a first block having the first record in a first record field, a third hash in a block hash field, and a fourth hash in a previous block pointer field, wherein the third hash is calculated based on the first record and the fourth hash, wherein the fourth hash is included in a block hash field of a second block, the second block being part of a main ledger that includes a third block having the second record in its record data field, wherein the third block is positioned prior to the second block in the main ledger.

13. The peer device of claim 12, wherein the first hash is calculated with a private key of a peer that corresponds to the first identification code.

14. The peer device of claim 13, wherein the first record and the second record are generated by the peer.

15. The peer device of claim 14, wherein the software is configured to:
receive a genesis message from the peer, the genesis message indicating a start of a first embedded ledger, the first embedded ledger including the first record and the third record, the genesis message including the first identification code in an identification code field and a hash that is calculated based on the first identification code,
wherein the main ledger includes a plurality of embedded ledgers including the first embedded ledger.

16. The peer device of claim 15, wherein the genesis message includes ordering information that indicates it is ordered prior to the first record and the second record in the first embedded ledger.

17. The peer device of claim 15, wherein the genesis message includes a public key corresponding to the private key of the peer.

18. The peer device of claim 17, wherein the software is configured to:
validate the first record by verifying the hash in the record hash field with the public key in the genesis message.

19. A method for constructing a ledger comprising:
receiving a first record, the first record including first record data, a first identification code in an identification code field, a first hash in a record hash field, and a second hash in a previous record pointer field, wherein the first hash is calculated based on the payload data, the first identification code, and the second hash, wherein the second hash is included in a record hash field of second record data, the second record data including the first identification code in its identification code field; and
generating a first block having the first record in a first record field, a third hash in a block hash field, and a fourth hash in a previous block pointer field, wherein the third hash is calculated based on the first record and the fourth hash, wherein the fourth hash is included in a block hash field of a second block, the second block being part of a main ledger that includes a third block having the second record in its record field, wherein the third block is positioned prior to the second block in the main ledger.

20. The method of claim 19, wherein the first hash is calculated with a private key of a peer that corresponds to the first identification code, wherein the first record and the second record are generated by the peer, the method comprising:
receiving a genesis message from the peer, the genesis message indicating a start of a first embedded ledger, the first embedded ledger including the first record and the third record, the genesis message including the first identification code in an identification code field and a hash that is calculated based on the first identification code,
wherein the main ledger includes a plurality of embedded ledgers including the first embedded ledger, wherein the genesis message includes a public key corresponding to the private key of the peer, the method comprising:
validating the first record by verifying the hash in the record hash field with the public key in the genesis message.

* * * * *